(12) United States Patent
Wen

(10) Patent No.: US 9,631,749 B2
(45) Date of Patent: Apr. 25, 2017

(54) QUICK RELEASE CONNECTOR

(71) Applicant: Yuan-Hung Wen, Changhua County (TW)

(72) Inventor: Yuan-Hung Wen, Changhua County (TW)

(*) Notice: Subject to any disclaimer, the term of this patent is extended or adjusted under 35 U.S.C. 154(b) by 96 days.

(21) Appl. No.: 14/688,384

(22) Filed: Apr. 16, 2015

(65) Prior Publication Data
US 2016/0084413 A1    Mar. 24, 2016

(30) Foreign Application Priority Data

Sep. 19, 2014   (TW) .............................. 103132452 A

(51) Int. Cl.
*F16L 21/08*    (2006.01)
*B62L 3/02*     (2006.01)
*F16L 37/23*    (2006.01)
*F16L 37/35*    (2006.01)

(52) U.S. Cl.
CPC .............. *F16L 21/08* (2013.01); *B62L 3/023* (2013.01); *F16L 37/23* (2013.01); *F16L 37/35* (2013.01)

(58) Field of Classification Search
CPC ....................................................... F16L 37/23
USPC ....................................................... 285/1, 277
See application file for complete search history.

(56) References Cited

U.S. PATENT DOCUMENTS

| | | | | |
|---|---|---|---|---|
| 2,428,638 A | * | 10/1947 | Scheiwer ................ | F16L 37/23 137/614.04 |
| 3,174,508 A | * | 3/1965 | Zahuranec ............. | F16L 37/23 285/277 |
| 3,236,251 A | * | 2/1966 | Hansen .................... | F16L 37/23 137/614.05 |
| 3,337,244 A | * | 8/1967 | Appleberry ............. | F16L 37/23 285/277 |
| 3,348,575 A | * | 10/1967 | Simak ..................... | F16L 37/23 285/306 |
| 3,351,362 A | * | 11/1967 | Hansen .................... | F16L 37/23 285/277 |
| 4,200,121 A | * | 4/1980 | Walter .................... | F16L 37/32 137/614 |

(Continued)

FOREIGN PATENT DOCUMENTS

TW          M 466864 U      12/2013

*Primary Examiner* — David E Bochna
(74) *Attorney, Agent, or Firm* — Muncy, Geissler, Olds & Lowe, P.C.

(57) ABSTRACT

A quick release connector is provided, including: a female connector, including an inner sleeve member, an outer sleeve member slidably sleeved on the inner sleeve member, a first elastic member abutting against between the inner and outer sleeve members, an blocking member disposed on and partially protrudable into the inner sleeve member and a first elastic abutting assembly disposed in the female connector; a male connector, including a connecting protrusion, the connecting protrusion being movable between a stuck position and a releasing position relative to the inner sleeve member, the connecting protrusion elastically abutted by the first elastic abutting assembly to be in the stuck position normally. Wherein, when the connecting protrusion is in the stuck position, the male connector is non-withdrawable from the female connector; and when the connecting protrusion is in the releasing position, the male connector is withdrawable from the female connector.

6 Claims, 5 Drawing Sheets

(56) References Cited

U.S. PATENT DOCUMENTS

| | | | | |
|---|---|---|---|---|
| 4,213,482 A | * | 7/1980 | Gondek | F16L 37/23 |
| | | | | 285/316 |
| 5,144,979 A | * | 9/1992 | Shobuzako | F16L 37/23 |
| | | | | 137/614.02 |
| 7,661,724 B2 | * | 2/2010 | Arosio | F16L 37/34 |
| | | | | 285/277 |
| 2007/0235092 A1 | * | 10/2007 | Danielson | F16L 37/23 |
| | | | | 137/614 |
| 2013/0019973 A1 | * | 1/2013 | Gose | F16L 37/23 |
| | | | | 137/798 |
| 2013/0056977 A1 | * | 3/2013 | Henderson | F16L 37/23 |
| | | | | 285/325 |

* cited by examiner

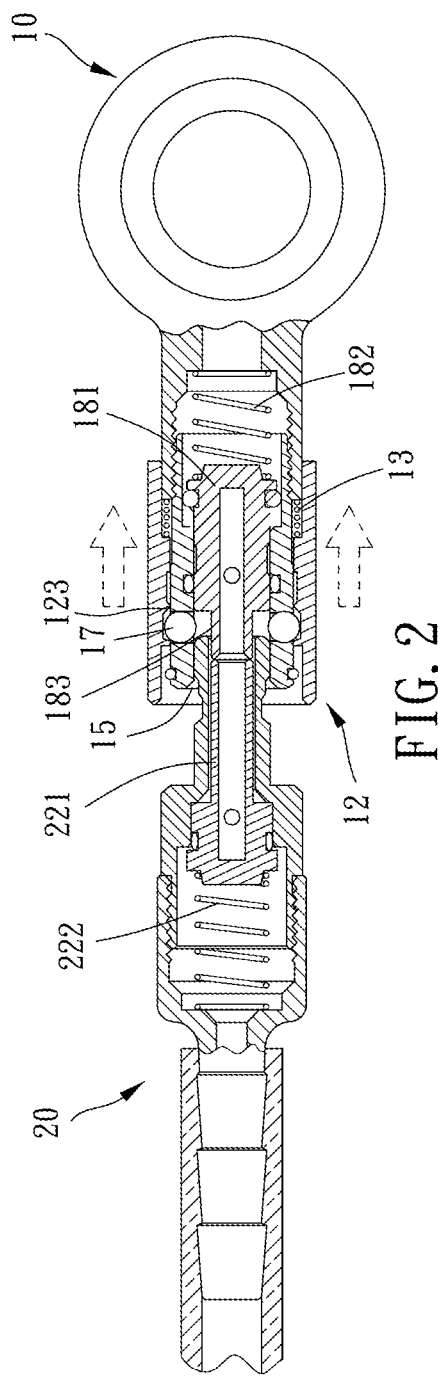
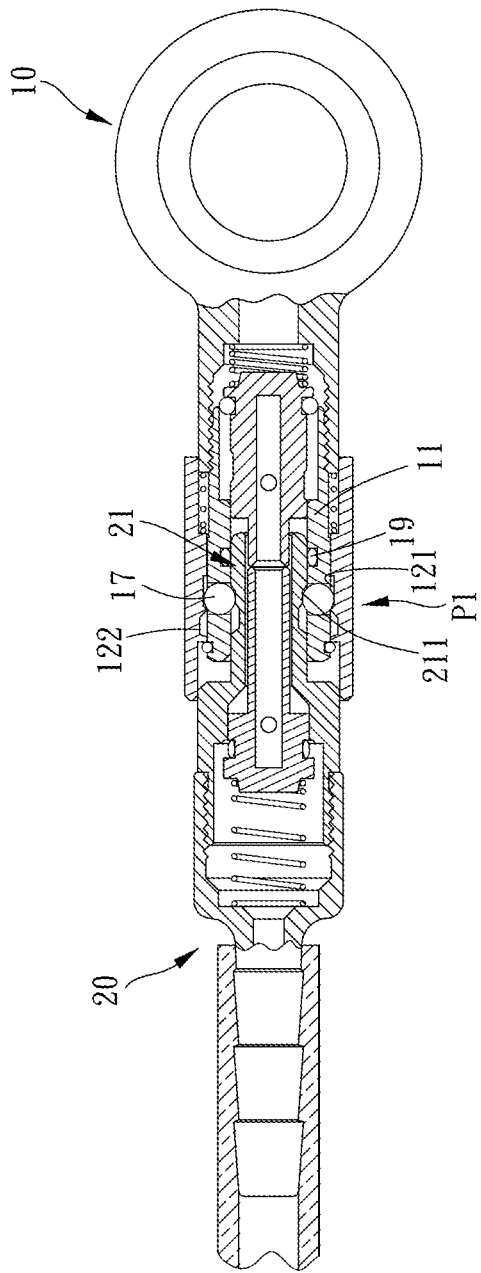
FIG. 2
FIG. 3

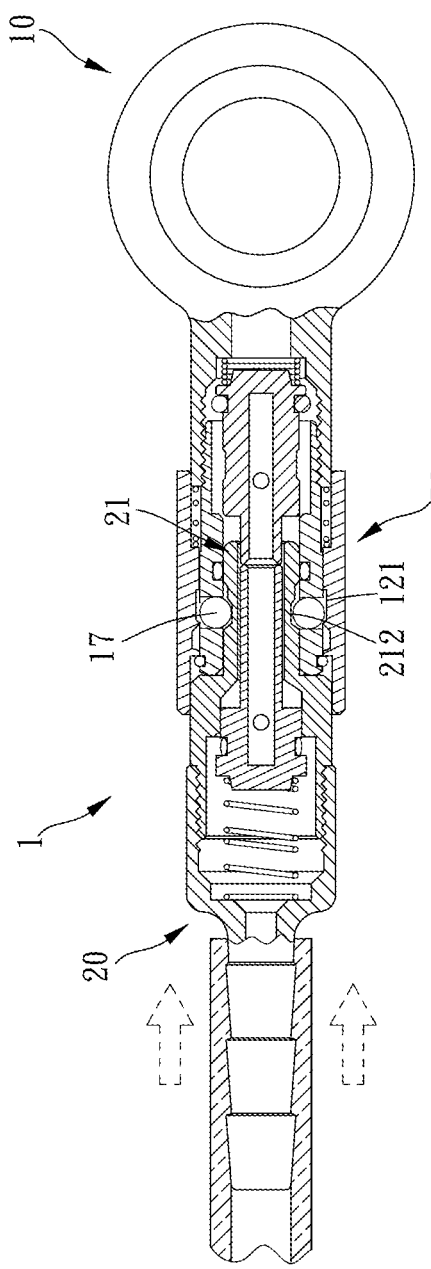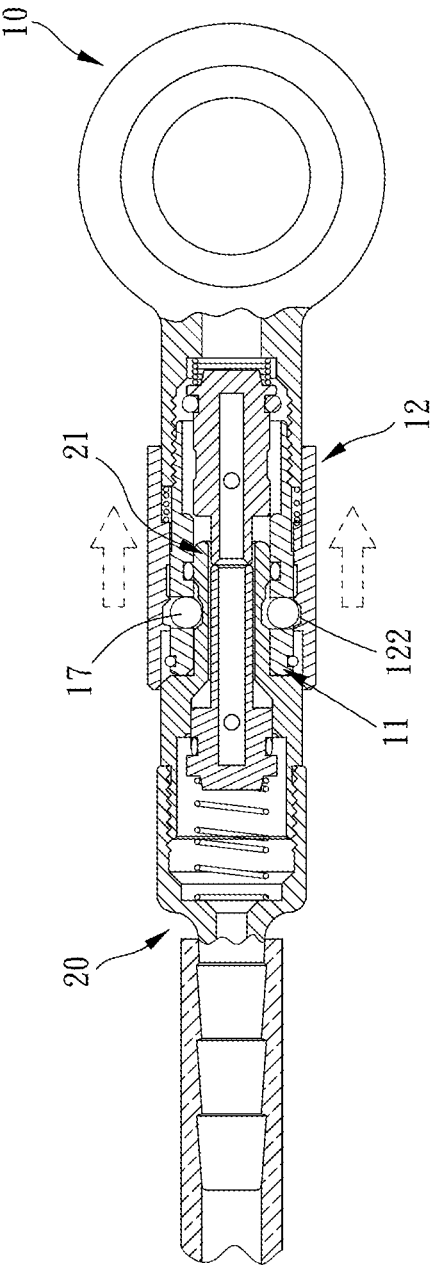

QUICK RELEASE CONNECTOR

BACKGROUND OF THE INVENTION

Field of the Invention

The present invention relates to a connector for pipeline, and more particularly to a quick release connector.

Description of the Prior Art

Conventionally, an oil pipeline is provided for being adapted to, for example, an oil pressure brake system of a bike, and the oil pipeline is usually assembled to a braking device. However, to assemble or disassemble the pipeline more quickly and conveniently, the pipeline is stuck with an engaging slot via a locking ball.

In the conventional structure, when an outer sleeve member is pushed, the locking ball and the engaging slot are stuck with each other to assemble the pipeline; and when the outer sleeve member is pulled, the locking ball and the engaging slot are not stuck with each other to disassemble the pipeline. However, because the outer sleeve member is fixed by only a spring, the outer sleeve member loses the fixing effect due to elastic fatigue of the spring, and the pipeline may fall off. In addition, the pipeline falls off easily when the outer sleeve is pushed or pulled by an unintentional force and may lead to problems such as oil leak and malfunction of the braking device. Furthermore, as disclosed in TWM 466864, the pipeline is screwed to prevent the pipeline from falling off. However, it is time-consuming to screw or unscrew the pipeline, and with proper tools, the pipeline may not be screwed tightly and may malfunction.

The present invention has arisen to mitigate and/or obviate the afore-described disadvantages.

SUMMARY OF THE INVENTION

The major object of the present invention is to provide a quick release connector in which an essential unlocking action is added to separate a male connector and a female connector to prevent the male connector from falling off from the female connector, and when the male connector is disassembled from the female connector, the male and female connector can be liquid-tight respectively to prevent leaking. It is safe, stable and convenient to adapt the present invention to a liquid system.

To achieve the above and other objects, a quick release connector is provided, including: a female connector, including an inner sleeve member, an outer sleeve member which is slidably sleeved on the inner sleeve member, a first elastic member which abuts against between the inner sleeve member and the outer sleeve member, an blocking member disposed on the inner sleeve member and partially protrudable into the inner sleeve member and a first elastic abutting assembly disposed in the female connector, the inner sleeve member formed with an inserting opening, the first elastic abutting assembly urging the inner sleeve member toward the inserting opening, the outer sleeve member formed with a first shallow recess and a first deep recess on an inner circumferential wall thereof, a protrusion disposed between the first shallow recess and the first deep recess; a male connector, including a connecting protrusion, the connecting protrusion formed with a second shallow recess and a second deep recess, the connecting protrusion releasably inserted into the inner sleeve member and connected with the inner sleeve member, the connecting protrusion being movable between a stuck position and a releasing position relative to the inner sleeve member, the connecting protrusion elastically abutted by the first elastic abutting assembly and located in the stuck position normally; wherein when the connecting protrusion is in the stuck position, the first and second shallow recesses correspond to each other, the blocking member is partially protrudable into the inner sleeve member and is located between the first and second shallow recesses, the connecting protrusion is stuck and abutted against a side of the blocking member, the first deep recess of the outer sleeve member is unmovable toward the blocking member; when the connecting protrusion is in the releasing position, the second deep recess corresponds to the first shallow recess, the blocking member is located between the second deep recess and the first shallow recess, the blocking member is partially retreatable into the second deep recess, the connecting protrusion is unabutted by the blocking member, the first deep recess of the outer sleeve member is movable toward the blocking member; when the first deep recess corresponds to the blocking member, the blocking member is partially retreatable into the first deep recess, and the connecting protrusion is withdrawable from the inner sleeve member.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 2 is a drawing showing an assembly of the preferred embodiment of the present invention;

FIG. 3 is a drawing showing a stuck position of the preferred embodiment of the present invention;

FIG. 4 is a drawing showing a releasing position of the preferred embodiment of the present invention;

FIG. 5 is a drawing showing a disassembly of the preferred embodiment of the present invention;

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
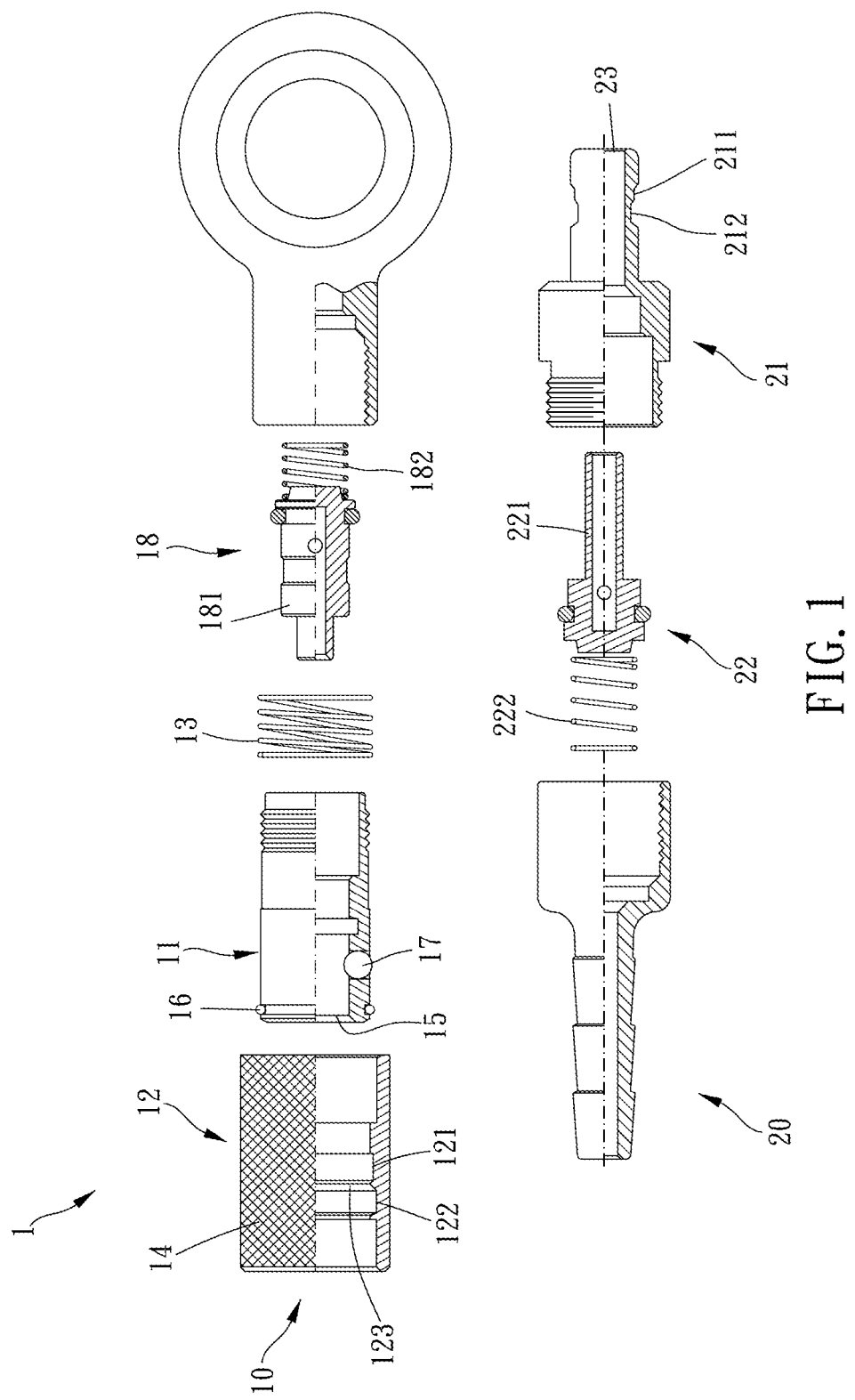
FIG. 1 is a breakdown view of a preferred embodiment of the present invention.

Please refer to FIGS. 1 to 3 for a preferred embodiment of a quick release connector 1 of the present invention. The quick release connector 1 includes a female connector 10 and a male connector 20.

The female connector 10 includes an inner sleeve member 11, an outer sleeve member 12 slidably sleeved on the inner sleeve member 11 and a first elastic member 13 abutting against between the inner sleeve member 11 and the outer sleeve member. For example, the inner and outer sleeve members 11, 12 may be made of stainless steel and be processed. The outer sleeve member 12 is slidably sleeved on the inner sleeve member 11, and an outer surface of the outer sleeve member 12 is preferably formed with an anti-slip portion 14 which is provided for a user to firmly grip on. Specifically, the first elastic member 13 may be a coil spring. An end of the inner sleeve member 11 is formed with an inserting opening 15, and an outer circumferential face of the inner sleeve member 11 near the inserting opening 15 is formed with a clasping member 16. When the first elastic member 13 elastically urges the outer sleeve member 12 toward the inserting opening 15, the clasping member 16 blocks a side of the outer sleeve member 12 position-limitedly to restrict the outer sleeve member 12 in a predetermined position.

The female connector 10 further includes a blocking member 17 disposed in the inner sleeve member 11 and partially protrudable into the inner sleeve member 11 and a first elastic abutting assembly 18 disposed in the female connector 10. The first elastic abutting assembly 18 elastically urges the inner sleeve member 11 toward the inserting opening 15, and the outer sleeve member 12 is formed with a first shallow recess 121 and a first deep recess 122 on an inner circumferential wall thereof. A protrusion 123 is disposed between the first shallow recess 121 and the first deep recess 122. More specifically, in this embodiment, the blocking member 17 may be a sphere. The first elastic abutting assembly 18, for example, includes a first resistance member 181 and a first elastic abutting member 182, and the first elastic abutting member 182 elastically abuts against between an inner wall of the inner sleeve member 11 and the first resistance member 181 to urge the first resistance member 181 toward the inserting opening 15.

The male connector 20 includes a connecting protrusion 21, and the connecting protrusion 21 is formed with a second shallow recess 211 and a second deep recess 212. For example, the male connector 20, the second shallow recess 211 and the second deep recess 212 may be made of stainless steel and be processed through lathing. The male connector 20 further includes a second elastic abutting assembly 22 disposed in the male connector 20 and an opening 23 disposed at an end of the connecting protrusion 21. Specifically, the second elastic abutting assembly 22 includes a second resistance member 221 and a second elastic abutting member 222 which elastically abuts against between an inner wall of the male connector 20 and the second resistance member 221. The second elastic abutting member 222 elastically urges the second resistance member 221 toward the opening 23.

The connecting protrusion 21 is releasably inserted into the inner sleeve member 11 and connected with the inner sleeve member 11. More specifically, in this embodiment, an end of the first resistance member 181 has a recessed stepped portion 183. During an insertion of the connecting protrusion 21 into the inner sleeve member 11, the second resistance member 221 abuts the first resistance member 181 to move backward to allow the blocking member 17 to correspond to the recessed stepped portion 183 (as shown in FIG. 2). The recessed stepped portion 183 allows the blocking member 17 to partially retreat so that the protrusion 123 of the outer sleeve member 12 is unabutted by the blocking member 17, the first deep recess 122 is movable toward the blocking member 17 (as shown by the arrow in FIG. 2) so as to allow the connecting protrusion 21 to continue to be inserted into the inner sleeve member 11 and be connected with the inner sleeve member 11. More specifically, the connecting protrusion 21 is insertable into the inner sleeve member 11 to allow the second shallow recess 211 to correspond to the blocking member 17, and the first elastic member 13 elastically urges the outer sleeve member 12 toward the inserting opening 15 to allow the first shallow recess 121 to correspond to the blocking member 17 so that the blocking member 17 is located between the first and second shallow recesses 121, 211 and that the connecting protrusion 21 is stuckable with the blocking member 17 to be connected with the inner sleeve member 11 (as shown in FIG. 3).

Figure 6:
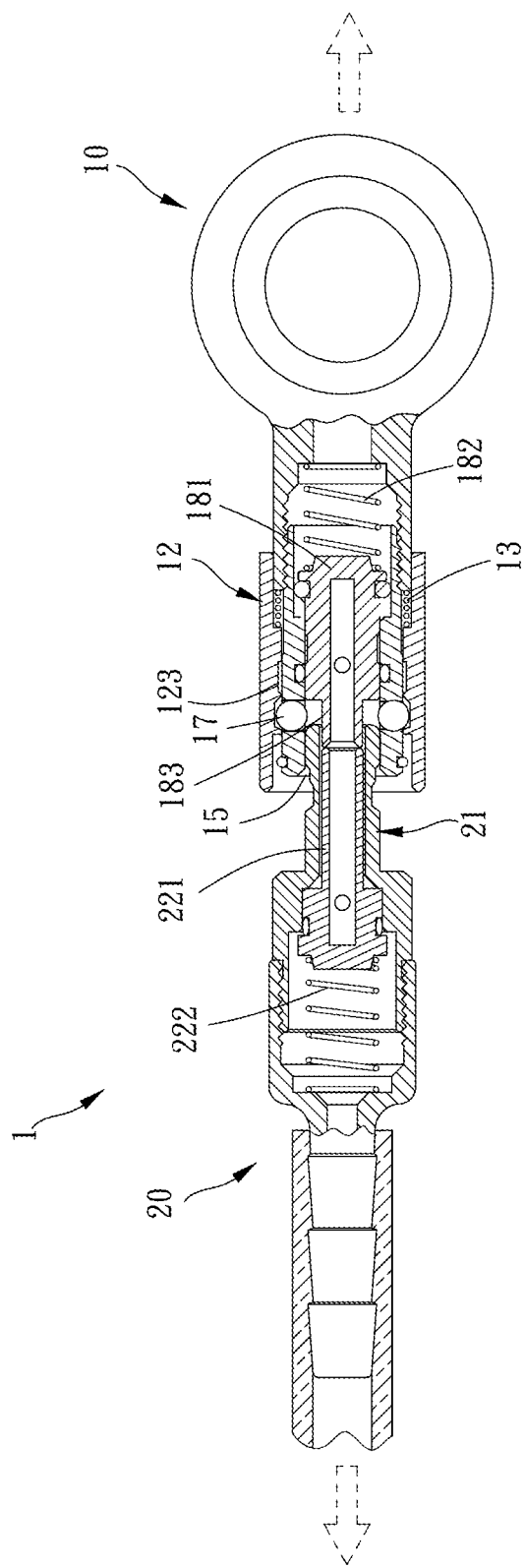
FIG. 6 is another drawing showing a disassembly of the preferred embodiment of the present invention.

Please further refer to FIGS. 4 to 6. The connecting protrusion 21 moves between a stuck position P1 (as shown in FIG. 3) and a releasing position P2 (as shown in FIG. 4) relative to the inner sleeve member 11, and the connecting protrusion 21 is elastically abutted by the first elastic abutting assembly 18 and stays in the stuck position P1 normally. More specifically, when the connecting protrusion 21 is in the stuck position P1, the first and second shallow recesses 121, 211 correspond to each other, the blocking member 17 is partially protrudable into the inner sleeve member 11 and is located between the first and second shallow recesses 121, 211, the connecting protrusion 21 is stuck at a side of the blocking member 17, and the first deep recess 122 of the outer sleeve member 12 is unmovable toward the blocking member 17; when the connecting protrusion 21 is in the releasing position P2, for example, a force is applied to the male connector 20 to actuate the male connector 20 to move toward the female connector 10 relatively (as shown by the arrow in FIG. 4), the second deep recess 212 corresponds to the first shallow recess 121, the blocking member 17 is located between the second deep recess 212 and the first shallow recess 121, the blocking member 17 is partially retreatable into the second deep recess 212, the connecting protrusion 21 is unabutted by the blocking member 17, and the first deep recess 122 of the outer sleeve member 12 is movable toward the blocking member 17. When the first deep recess 122 corresponds to the blocking member 17, for example, the outer sleeve member 12 is pulled to move relative to the inner sleeve member 11 (as shown by the arrow in FIG. 5), the blocking member 17 is partially retreatable into the first deep recess 122, and the male connector 20 is withdrawable from the female connector 10 (as shown in FIG. 6). Accordingly, the force needs to apply to the male connector 20 to actuate the male connector 20 to move toward the female connector 10 relatively, and the outer sleeve member 12 is pulled to move relative to the inner sleeve member 11 so that the male connector 20 can be separated from the female connector 10. The quick release connector 1 can prevent the male connector 20 from falling off from the female connector 10, so the quick release connector 1 is safer and more stable.

Figure 7:
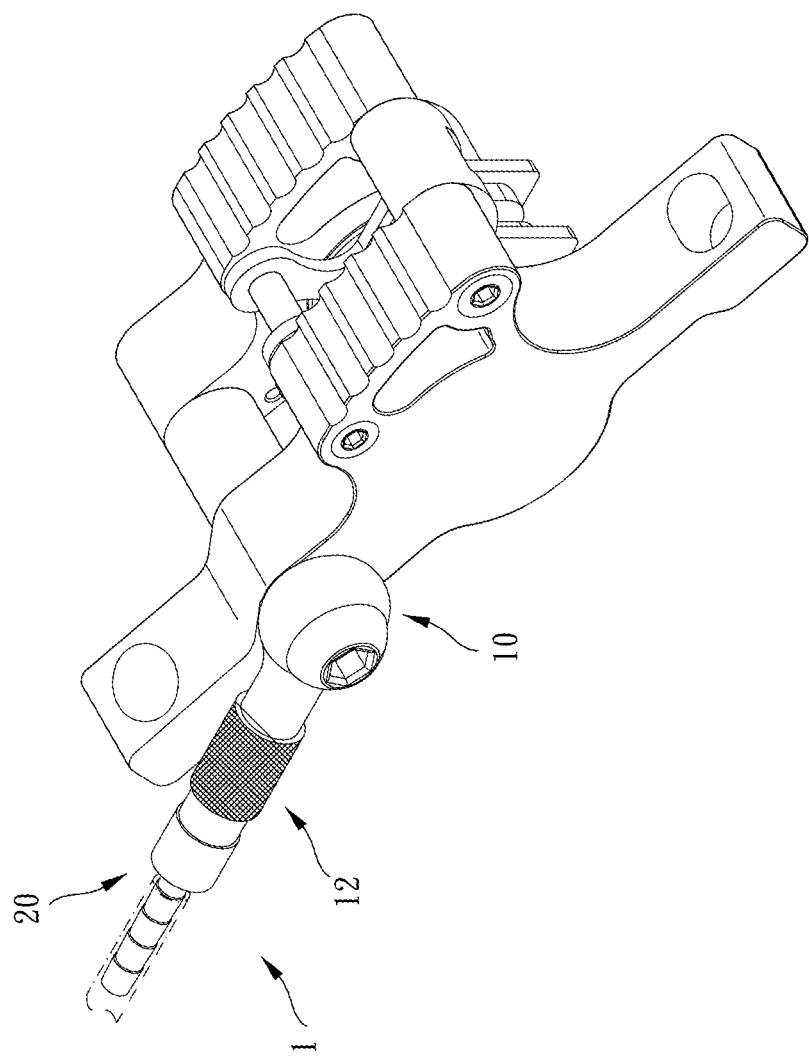
FIG. 7 is a drawing showing the preferred embodiment of the present invention in use.

In this embodiment, the first resistance member 181 is a valve member. The first resistance member 181 is movable between a first sealing position and a first communicating position, and the first elastic abutting member 182 urges the first resistance member 181 toward the sealing position normally. When the second resistance member 221 abuts the first resistance member 181 to move backward, the first resistance member 181 is in the first communicating position. The second resistance member 221 is also a valve member. The second resistance member 221 is movable between a second sealing position and a second communicating position, and the second elastic abutting member 222 urges the second resistance member 221 toward the sealing position normally. When the first resistance member 181 abuts the second resistance member 221 to move backward, the second resistance member 221 is in the second communicating position. Specifically, when the male connector 20 and the female connector 10 are mutually connected, the first and second resistance members 181, 221 abuts against each other to move backward, and an end of the male connector 20 communicates with an end of the female connector 10; when the male connector 20 and the female connector 10 are not connected with each other, the male connector 20 and the female connector 10 are sealed respectively. For example, as shown in FIG. 7, an end of the male connector 20 may be connected with, for example, an oil pipeline, and an end of the female connector 10 may be connected with, for example, a brake caliper. When the male connector 20 and the female connector 10 are connected and communicated with each other, the oil pipeline is applicable to a product; and when the male connector 20 and the female connector 10 are separated, the male connector 20 and the female connector 10 are liquid-tight respectively; therefore, oil can be prevented from leaking. In addition, the inner wall of the inner sleeve member 11 is formed with an annular sealing member 19 which is provided for abutting against an circumferential face of the connecting protrusion 21 to be liquid-tight so as to prevent oil from leaking when the male connector 20 and the female connector 10 are connected and communicated with each other.

Given the above, when using the quick release connector of the present invention, the user needs to unlock before separating the male connector and the female connector apart; therefore, the male connector can be prevented from falling off from the female connector accidentally. When the male connector and the female connector are separated from each other, the male connector and the female connector are liquid-tight respectively to prevent oil from leaking. The quick release connector is convenient for the user and is safe and stable to be adapted to a fluid system.

While we have shown and described various embodiments in accordance with the present invention, it should be clear to those skilled in the art that further embodiments may be made without departing from the scope of the present invention.

What is claimed is:

1. A quick release connector, including:
a female connector, including an inner sleeve member, an outer sleeve member slidably sleeved on the inner sleeve member, a first elastic member abutting against between the inner sleeve member and the outer sleeve member, a blocking member disposed on the inner sleeve member and partially protrudable into the inner sleeve member and a first elastic abutting assembly disposed in the female connector, the inner sleeve member having an inserting opening, the first elastic abutting assembly elastically abutting against the inner sleeve member toward the inserting opening, the outer sleeve member formed with a first shallow recess and a first deep recess on an inner circumferential wall thereof, a protrusion disposed between the first shallow recess and the first deep recess;
a male connector, including a connecting protrusion, the connecting protrusion formed with a second shallow recess and a second deep recess, the connecting protrusion being releasably inserted into the inner sleeve member and connected with the inner sleeve member, the connecting protrusion being movable between a stuck position and a releasing position relative to the inner sleeve member, the connecting protrusion elastically abutted by the first elastic abutting assembly and normally located in the stuck position;
wherein when the connecting protrusion is in the stuck position, the first and second shallow recesses correspond to each other, the blocking member is partially protrudable into the inner sleeve member and is located between the first and second shallow recesses, the connecting protrusion is stuck and abutted against a side of the blocking member, the first deep recess of the outer sleeve member is unmovable toward the blocking member; when the connecting protrusion is in the releasing position, the second deep recess corresponds to the first shallow recess, the blocking member is located between the second deep recess and the first shallow recess, the blocking member is partially retreatable into the second deep recess, the connecting protrusion is unabutted with the blocking member, the first deep recess of the outer sleeve member is movable toward the blocking member; when the first deep recess corresponds to the blocking member, the blocking member is partially retreatable into the first deep recess, and the connecting protrusion is withdrawable from the inner sleeve member;
wherein the first elastic abutting assembly includes a first resistance member and a first elastic abutting member, the first elastic abutting member abuts against between an inner wall of the inner sleeve member and the first resistance member and urges the first resistance member toward the inserting opening, the male connector includes a second elastic abutting assembly disposed therein and an opening disposed at an end of the connecting protrusion, the second elastic abutting assembly includes a second resistance member and a second elastic abutting member which abuts against between an inner wall of the male connector and the second resistance member, and the second elastic abutting member urges the second resistance member toward the opening;
wherein an end of the first resistance member has a recessed stepped portion, during insertion of the connecting protrusion into the inner sleeve member, the second resistance member abuts the first resistance member to move backward to allow the blocking member to move radially within the recessed stepped portion so that the protrusion of the outer sleeve member is unabutted by the blocking member, the first deep recess is movable toward the blocking member, and the connecting protrusion is insertable into the inner sleeve member to be connected with the inner sleeve member.

2. The quick release connector of claim 1, wherein the first resistance member is a valve member, the first resistance member is movable between a first sealing position and a first communicating position, the first elastic abutting member normally urges the first resistance member toward the sealing position, and when the second resistance member abuts the first resistance member to move backward, the first resistance member is in the first communicating position.

3. The quick release connector of claim 1, wherein the second resistance member is a valve member, the second resistance member is movable between a second sealing position and a second communicating position, the second elastic abutting member normally urges the second resistance member toward the sealing position, and when the first resistance member abuts the second resistance member to move backward, the second resistance member is in the second communicating position.

4. The quick release connector of claim 1 further including a clasping member disposed on an outer circumferential surface of the inner sleeve member and near the inserting opening, the first elastic member urging the outer sleeve member toward the inserting opening, and the clasping member blocking a side of the outer sleeve member.

5. The quick release connector of claim 1, wherein the blocking member is a sphere.

6. The quick release connector of claim 1, wherein an inner wall of the inner sleeve member is formed with an annular sealing member, and the annular sealing member is provided for abuttingly contacting a circumferential face of the connecting protrusion to form a liquid-tight connection between the inner sleeve member and the connecting protrusion.

* * * * *